Feb. 12, 1935.    F. L. BARBER ET AL    1,990,924
LATERAL MOTION ROLLER SEAT FOR CAR TRUCKS
Filed March 16, 1934
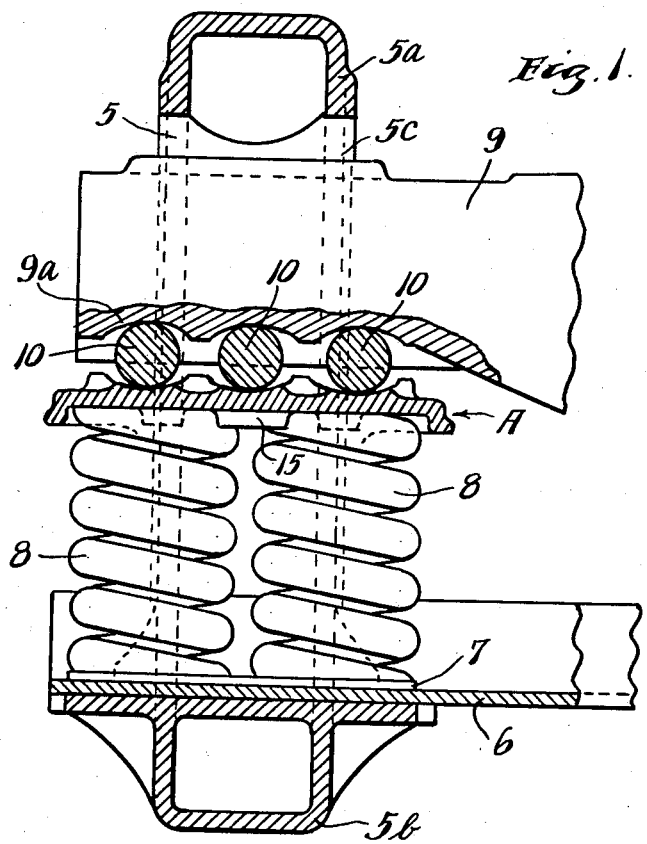
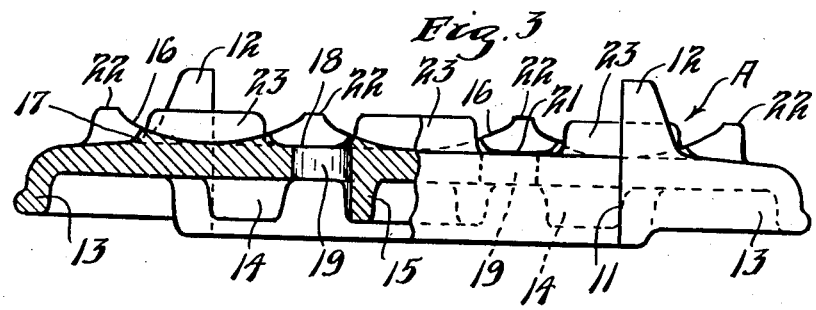
INVENTORS.
FRANKLIN L. BARBER.
EDWIN W. WEBB.
BY THEIR ATTORNEYS.

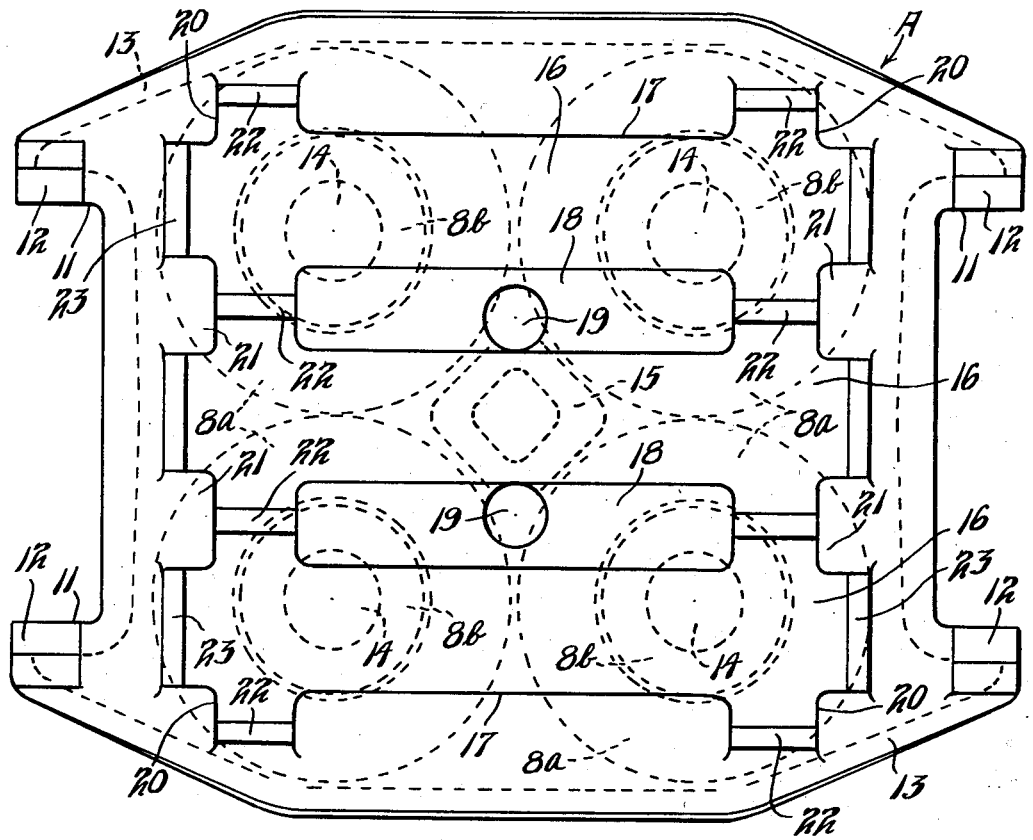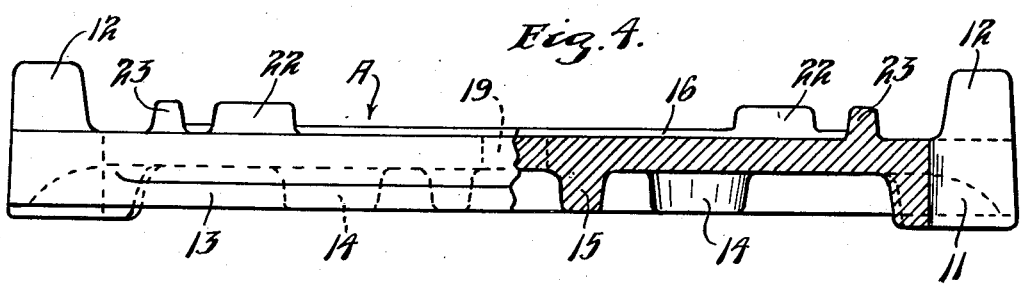

Patented Feb. 12, 1935

1,990,924

UNITED STATES PATENT OFFICE 1,990,924

LATERAL MOTION ROLLER SEAT FOR CAR TRUCKS

Franklin L. Barber and Edwin W. Webb, Chicago, Ill., assignors to Standard Car Truck Company, Chicago, Ill., a corporation of New Jersey Application March 16, 1934, Serial No. 715,910

7 Claims. (Cl. 105—186)

This invention relates to lateral motion car trucks incorporating therein what are known as Barber lateral motion devices. These lateral motion devices include roller beds formed in the truck bolster, lower roller seats supported by springs from the side frames of the car truck and having roller beds therein and rollers fitting within the various roller beds and interposed between the truck bolsters and the lower roller seats. The invention relates particularly to improvements in the lower roller seats of these devices.

Difficulty has been experienced in connection with such roller seats as that shown in Edward W. Webb and Franklin L. Barber's Patent No. 1,206,391, entitled "Roller seat for lateral motion trucks" issued Nov. 28, 1916, by reason of the fact that, at times, dirt accumulates in the roller beds of these seats sufficiently to interfere with proper travel of the rollers.

It is one of the main objects of this invention, therefore, to provide a lateral motion roller seat for car trucks of novel and improved construction, which will prevent the accumulation of dirt and dust in the roller beds of the seat.

Another object of the invention is to provide novel means for draining the roller beds in such roller seats.

Still another object is to provide a novel and improved roller seat which rests directly upon the springs supported by the side frame of a car truck and which roller seat includes means for housing and centering the upper ends of these springs.

To these ends, generally stated, the invention consists in the novel parts and novel combinations of parts hereinafter defined in the claims and described in the following specification, made in connection with the accompanying drawings, wherein like reference characters refer to the same or similar parts throughout the various views, and, in which, Fig. 1 is a vertical transverse section taken through portions of a car truck wherein a roller seat embodying the present invention is incorporated;

Fig. 2 is a plan view of the roller seat illustrated in Fig. 1;

Fig. 3 is a view partly in end elevation and partly in transverse section illustrating the same roller seat; and Fig. 4 is a view partly in side elevation and partly in longitudinal section illustrating the roller seat.

Referring to the drawings, certain portions of a car truck are illustrated, which include a side frame designated as an entirety by the numeral 5 and including a compression member 5a of inverted U-shape in cross section, a tension member 5b and bolster columns, one of which is shown and is designated by the numeral 5c. One end of a spring plank 6 is shown and this spring plank normally extends between the two side frames of a truck and rests at its ends on the tension members 5b between the columns 5c. A spring plate 7 rests on each end of the spring plank 6 and supported upon this plate is a spring group, which in accordance with the embodiment shown, includes four compound springs 8 disposed at the corners of a square. Each compound spring includes an outer coil 8a and an inner coil 8b indicated in dotted lines Fig. 2. One end of a truck bolster 9 is illustrated and this end of the bolster extends into the bolster opening between the columns 5c and the lower surface of the bolster near its end is equipped with spaced concavities forming upper roller beds 9a. Lateral motion rollers 10 fit partly within the upper roller beds 9a and rest on and bear against a lateral motion roller seat designated as an entirety by the letter A and forming the subject matter of the present invention. This roller seat A is supported by the upper ends of the springs 8 and caps these springs as will be later described more in detail.

The roller seat A consists of a single integral plate, cast, pressed or otherwise formed. This plate may be shaped as best shown in Fig. 2, and it is equipped at its two ends with indentations forming jaws 11 which abut the faces and the inner and outer sides of the columns 5c and limit lateral movement of the roller seat relative to the side frame. Heavy upstanding lugs 12 form continuations of the jaws so as to provide bearing surfaces of large area working against the inner and outer sides of the columns 5c. On its under side, the roller seat is formed with a continuous heavy peripheral flange 13 that follows the inner and outer side edges of the seat and the end edges thereof. This flange adds great strength to the roller seat; it assists in housing and centering the upper ends of the springs 8 and it provides surfaces of large area working against the inner faces of the columns 5c. Also projecting downwardly from the under surface of the roller seat are spring centering cylinders 14 which in the embodiment shown are four in number and these cylinders are set at the four corners of a square to receive the inner coils 8b of the springs 8 about the same and assist in centering the various springs. Projecting downwardly from the central portion of the under surface of the roller seat is a rib 15 which, in the embodiment shown, is of substantially square-shape and this rib acting in conjunction with the flange 13 serves to center and prevent displacement of the upper ends of the outer coils 8a of the springs 8. It should perhaps be here stated that spring centering cylinders 14 of a requisite number to accommodate any desired number of springs in a spring group may be provided on the under surface of the roller seat and that suitably formed ribs corresponding in function to the rib 15 may be provided on the under surface of the roller seat to act with the cylinders and with the flange 13 to house and prevent displacement of the upper ends of the springs 8. It should also be stated that it is not essential that springs 8 including both inner and outer coils 8a and 8b be used with the roller seat inasmuch as the inner coils may be eliminated entirely, the outer coils may be eliminated entirely or, if desired, the spring group may include certain springs having only inner coils, certain springs having only outer coils, or the spring group may include certain compound springs and certain springs having only outer coils.

On the upper surface of the roller seat, there are formed preferably a plurality of spaced parallel roller beds 16 which project upwardly somewhat from the remainder of the upper surface of the seat and extend generally longitudinally thereof. These roller beds are preferably of concave curvature as shown and the rollers 10 are received partially within the same to work thereover. These roller beds are notched inwardly at their sides to form notched portions 17 at the inner side of the innermost bed and at the outer side of the outermost bed and to form depressions 18 or notched portions set between adjacent beds at lower levels than the beds. Drainage openings 19 are provided through the roller seat and these openings extend from the depressed portions 18 through opposite corners of the rib 15 in such position that water draining through these openings will fall betwen adjacent springs 8.

The corners of the various roller beds 16 are also notched by notches 20 and 21 to form passages through which dirt and dust may be swept by wind action and also by travel of the rollers 10 on the beds 16. Upstanding lugs 22 are provided at the unnotched portions of the side edges of the roller beds and these lugs limit rolling movement of the rollers transversely of the beds and roller seat. Certain of these lugs 22 placed between adjacent beds 16 connect the adjacent beds and serve as outer stops limiting outward rolling action of the rollers in certain beds and the inner rolling action of the rollers in beds adjacent thereto. At the unnotched portions of the ends of the beds, upstanding lugs 23 are provided which limit endwise movement of the rollers 10 longitudinally of the beds. It should be noted that the notches 20 and 21 space the lugs 22 both longitudinally and transversely of the roller seat from the lugs 23 adjacent thereto.

When one of the roller seats A is in use on a car truck, the springs 8 of the spring group bear directly against the underside of the roller seat and the upper ends of these springs are housed and centered by the flange 13, the cylinders 14 and the rib 15. The rollers 10 are, of course, free for travel in the roller beds 16 and as the rollers travel back and forth through lateral motion of the bolster 9 relative to the side frames 5, the rollers will work any dirt or dust accumulating in the roller seats off the same by forcing the dirt and dust through channels formed by notches 20, 21, 17 and 18. The wind also assists in sweeping the roller beds clear of dust and dirt. Drainage of water from the depressed portions 18 may take place through the drainage openings 19 and drainage of water from the roller beds 16 may take place readily by reason of the notches in these beds. As water will not accumulate in the depressed portions 18, the roller beds will dry out much faster than would otherwise be the case if the drainage openings 19 were not provided and, as a result, dust or dirt caught by the water and tending to accumulate in the roller beds may be swept by the wind and acted on by the rollers to clear the roller beds much quicker than would be the case if the drainage openings 19 were not provided. The rib 15 in addition to acting to center the springs 8 also serves to strengthen the roller seat.

It will, of course, be understood that various changes may be made in the roller seat to adapt it for use with other types of spring groups than the type illustrated. It will be further understood that any number of roller beds may be provided in the roller seat. It will also be understood that various other changes may be made in the form, details, arrangement and proportions of the various parts without departure from the scope of the present invention.

What is claimed is:—

1. A lateral motion roller seat for car trucks comprising a plate having a plurality of roller beds formed on its upper surface, upstanding lugs on the upper surface of said plate limiting endwise movement of the rollers longitudinally of said beds and upstanding lugs on the upper surface of said plate limiting rolling movement of said rollers transversely of said beds, said first mentioned lugs being respectively spaced from adjacent last mentioned lugs to form clearance channels for dust and dirt accumulating on said beds.

2. A lateral motion roller seat for car trucks comprising a plate having a plurality of roller beds formed on its upper surface, upstanding lugs on the upper surface of said plate limiting endwise movement of the rollers longitudinally of said beds, and upstanding lugs on the upper surface of said plate limiting rolling movement of said rollers transversely of said beds, the first mentioned lugs for adjacent beds being transversely spaced from each other and the last mentioned lugs being both transversely and longitudinally spaced from adjacent first mentioned lugs to form clearance channels for dust and dirt accumulating on said beds.

3. A lateral motion roller seat for car trucks comprising a plate having a plurality of roller beds formed on its upper surface, upstanding lugs on the upper surface of said plate limiting endwise movement of the rollers longitudinally of said beds, adjacent lugs being transversely spaced from each other, and upstanding lugs on the upper surface of said plate near the ends of said beds limiting rolling movement of said rollers transversely of said beds, said last mentioned lugs being both longitudinally and transversely spaced from said first mentioned lugs and said last mentioned lugs at opposite ends of the respective beds being longitudinally spaced from each other to form clearance channels for dust and dirt accumulating on said beds.

4. A lateral motion roller seat for car trucks comprising a plate having a plurality of upstanding roller beds formed on its upper surface, the corners of said roller beds being notched downwardly, upstanding lugs projecting from unnotched portions of the ends of said beds and limiting endwise movement of the rollers longitudinally of the beds, and upstanding lugs projecting from unnotched portions of the side edges of said beds and limiting rolling movement of said rollers transversely of said beds.

5. A lateral motion roller seat for car trucks comprising a plate having a plurality of roller beds formed on its upper surface, said beds upstanding from the remainder of the upper surface of said plate and having notches at their sides and at their corners, there being upstanding lugs formed at the unnotched edges of said beds, certain of which lugs limiting endwise movement of the rollers longitudinally of the beds and certain of which lugs limiting rolling movement of the rollers transversely of the beds, said notches forming clearance channels for dust and dirt accumulating on said beds.

6. A lateral motion roller seat for car trucks comprising a plate having a plurality of roller beds formed on its upper surface, and upstanding from the balance of said upper surface, adjacent edges of adjacent beds being notched to form depressed portions below the level of said beds, upstanding lugs on the upper surface of said plate limiting endwise movement of rollers longitudinally of said beds, upstanding lugs on the upper surface of said plate limiting rolling movement of said rollers transversely of said beds, said first mentioned lugs being respectively spaced from adjacent last mentioned lugs to form clearance channels for dust and dirt accumulating on said beds, said depressed portions having drain openings therethrough.

7. A lateral motion roller seat for car trucks comprising a plate having a plurality of roller beds formed on its upper surface and upstanding from the balance of the upper surface, said roller beds being notched at their corners and notched at their side edges, the notches in adjacent side edges of adjacent beds forming depressed portions and said depressed portions having drainage openings therethrough, and upstanding lugs formed at unnotched portions of the end edges and side edges of said beds, certain of said lugs limiting endwise movement of the rollers longitudinally of the beds and certain of said lugs limiting rolling movement of said rollers transversely of the beds.

FRANKLIN L. BARBER.
EDWIN W. WEBB.